United States Patent
Yano et al.

(10) Patent No.: US 8,274,710 B2
(45) Date of Patent: Sep. 25, 2012

(54) IMAGE PROCESSING USING COUNT VARIATION

(75) Inventors: Takaaki Yano, Tokyo (JP); Hirokazu Tamura, Kawasaki (JP); Atsushi Matsumoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 671 days.

(21) Appl. No.: 12/479,547

(22) Filed: Jun. 5, 2009

(65) Prior Publication Data

US 2009/0323132 A1 Dec. 31, 2009

(30) Foreign Application Priority Data

Jun. 25, 2008 (JP) ................... 2008-166089

(51) Int. Cl.
*H04N 1/40* (2006.01)
*G06K 9/00* (2006.01)
(52) U.S. Cl. ............. 358/466; 358/2.1; 382/163
(58) Field of Classification Search .......... None
See application file for complete search history.

(56) References Cited

U.S. PATENT DOCUMENTS

| | | | |
|---|---|---|---|
| 5,157,740 A * | 10/1992 | Klein et al. ............ | 382/271 |
| 5,689,590 A | 11/1997 | Shirasawa et al. | |
| 6,118,895 A | 9/2000 | Hirota et al. | |
| 7,164,493 B1 | 1/2007 | Matsumoto et al. | |
| 7,505,174 B2 | 3/2009 | Matsumoto et al. | |
| 8,031,941 B2 * | 10/2011 | Suino ............ | 382/176 |
| 2009/0091801 A1 * | 4/2009 | Hong ............ | 358/464 |
| 2009/0097072 A1 | 4/2009 | Tamura | |
| 2009/0147286 A1 | 6/2009 | Yano et al. | |

FOREIGN PATENT DOCUMENTS

| | | |
|---|---|---|
| JP | 6-197216 | 7/1994 |
| JP | 6-253135 | 9/1994 |
| JP | 8-307722 | 11/1996 |
| JP | 2008-60839 | 3/2008 |

OTHER PUBLICATIONS

U.S. Appl. No. 12/427,432, filed Apr. 21, 2009. Applicant: Hirokazu Tamura.

* cited by examiner

*Primary Examiner* — Twyler Haskins
*Assistant Examiner* — Barbara Reinier
(74) *Attorney, Agent, or Firm* — Fitzpatrick, Cella, Harper & Scinto

(57) ABSTRACT

Input image data is converted into a brightness component to obtain a difference between the brightness component and a threshold. A count variation is determined based on the obtained difference, and the counter is used to follow up and change the threshold. The threshold obtained by the follow-up and change is used to execute a background color removal process in each pixel by executing a signal conversion process.

23 Claims, 12 Drawing Sheets

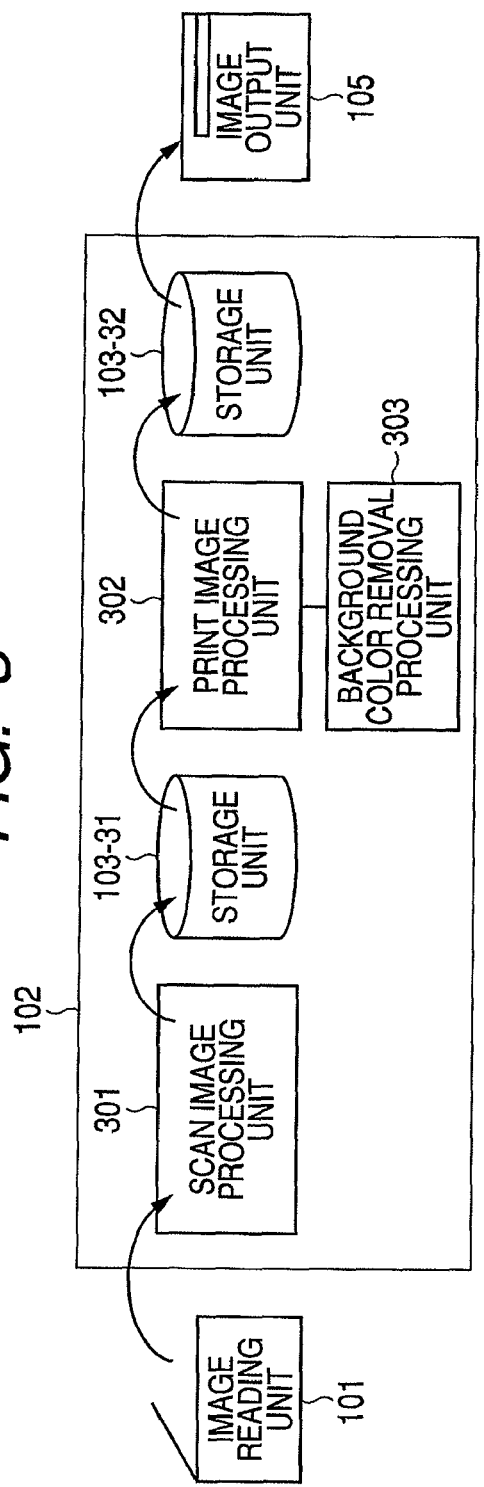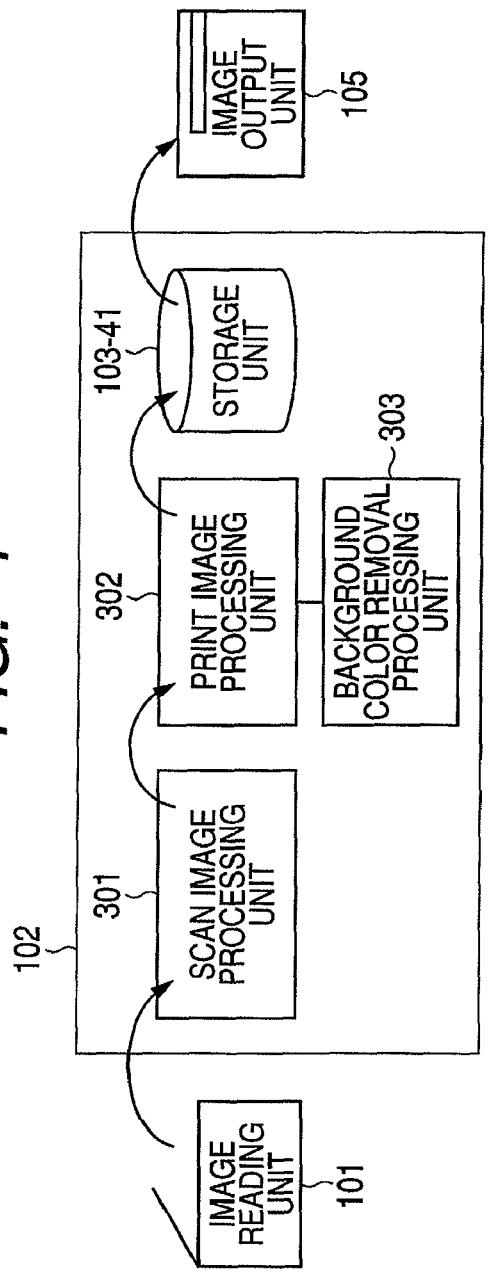

| AREA | area1 | area2 | area3 | area4 | area5 | area6 |
|---|---|---|---|---|---|---|
| COUNT | 4 | 2 | 1 | -4 | -2 | -1 |

| AREA | L1 | L2 | L3 | L4 | L5 | L6 |
|---|---|---|---|---|---|---|
| S1 | 10 | 5 | 3 | −10 | −5 | −3 |
| S2 | 4 | 3 | 2 | −4 | −3 | −2 |
| S3 | 2 | 1 | 0 | −2 | −1 | 0 |

| AREA | area7 | area8 | area9 | area10 | area11 |
|---|---|---|---|---|---|
| FILTER SIZE | 7×7 | 3×3 | 1×1 | 3×3 | 1×1 |

| ATTRIBUTE FLAG | CHARACTER | HALFTONE DOT | PHOTOGRAPH | BACKGROUND |
|---|---|---|---|---|
| FILTER SIZE | 1×1 | 7×7 | 3×3 | 7×7 |

| DOCUMENT TYPE | CHARACTER | PRINTING PAPER PHOTOGRAPH | PHOTOGRAPH |
|---|---|---|---|
| FILTER SIZE | 1×1 | 3×3 | 3×3 | it # IMAGE PROCESSING USING COUNT VARIATION

BACKGROUND OF THE INVENTION

1. Field of the Invention

The present invention relates to an image processing apparatus, a method of image processing, a computer program, and a storage medium, and for example, to image processing for executing a background color removal process of an image.

2. Description of the Related Art

In general, various image processes for faithfully reproducing a document read by a scanner are executed in a copy process of a digital color copying machine. The color of paper of a document, or the background section, is usually not pure white, but is slightly colored in most cases. Therefore, even the background section is faithfully reproduced using color materials when a copy process is executed, which causes various adverse effects such as wasting of the color materials.

Meanwhile, the following process is known as optimal image processing corresponding to the background color included in a document image. A luminance histogram of an image read by a scanner is first created, and a signal level (hereinafter "background level") of the background of the document image is detected based on the luminance histogram. A process of removing the background from the image is then executed by subtracting the background level from the image signal.

In general, the background color removal process can be roughly classified into two processes depending on the system configuration including the process.

FIG. 3 illustrates an example of a system configuration of a first background color removal process. In FIG. 3, an image reading unit 101, such as a scanner, reads a document image. A scan image processing unit 301 applies image processing, such as a shading correction process, a filtering process, and an input color correction process not shown, to the document image read by the image reading unit 101. A storage unit 103-31 stores contone image information of one page of document image after the scanner image process. A print image processing unit 302 executes image processing, such as the background color removal process as well as an output color correction process and a halftone process not shown. A storage unit 103-32 stores halftone image information of one page of document image after the print image processing. An image output unit 105, such as a printer, outputs image information stored in a storage area. The contone image information of the read document is temporarily stored in the storage area 103-31, and the background color removal processing unit 303 executes the background color removal process based on the image information of the entire surface of the stored document.

Examples of conventional background color removal processing techniques related to the configuration include Japanese Patent Application Laid-Open Nos. H06-253135 and H08-307722. In Japanese Patent Laid-Open No. H06-253135, a background level is detected from an image read from a document, the read image is stored in a storage unit at the same time, an optimal gamma correction table is created according to the detected background level, and a gamma correction is executed to remove the background of the read image.

In Japanese Patent Application Laid-Open No. H08-307722, a histogram of document is created, the information is used to detect a background level, and the detected background level is used to execute a background color removal process, thereby executing a background color removal process suitable for the document type.

FIG. 4 illustrates an example of a system configuration of a second background color removal process. In FIG. 4, the image reading unit 101 such as a scanner reads a document image. The scan image processing unit 301 applies image processing, such as a shading correction process, a filtering process, and an input color correction process not shown, to the document image read by the image reading unit 101. The print image processing unit 302 executes image processing, such as the background color removal process as well as an output color correction process and a halftone process not shown. A storage unit 103-41 stores halftone image information of one page of document image after the print image processing. The image output unit 105, such as a printer, outputs image information stored in a storage area. The configuration can be realized at lower cost compared to the first system configuration illustrated in FIG. 3 above mentioned because a storage area of one page of contone image is not required. In other words, a storage unit that stores contone image information in the middle of image processing is not included in the configuration of FIG. 4. Therefore, the background process can be sequentially executed while the reading is advanced.

Other examples of the background color removal process include Japanese Patent Application Laid-Open Nos. H06-197216 and 2008-060839. In Japanese Patent Application Laid-Open No. H06-197216, pixels read from a read document are sequentially separated into brightness/color difference information, the white level is changed according to the brightness component, and a threshold is used for the color difference component in an attempt to compress the color value. In this way, the background color is approximated to an achromatic color.

In Japanese Patent Application Laid-Open No. 2008-060839, pixels read from a read document are separated into a brightness component and a color difference component, which of the brightness component and a threshold is greater is determined, and the determined number of pixels is counted to follow up and change the threshold. Which of the color difference component and a threshold is greater is also determined, and the determined number of pixels is counted to follow up and change the threshold.

However, a histogram of document is used for the background color removal methods in Japanese Patent Application Laid-Open Nos. H06-253135 and H08-307722. Therefore, there is a problem that the methods can only be realized on a system configuration that can store contone image information of one page of document as illustrated in FIG. 3. In recent years, the capacity required for the storage device tends to increase with the expansion of the readout resolution of document. In a printer/complex machine field where the competition for cost reduction is intense, the capacity of storage device is one of the large factors that affect the cost, and the use of the present system configuration is an obstacle for realizing the reduced cost.

The brightness component of the foreground color also becomes high in Japanese Patent Application Laid-Open No. H06-197216 unless the background area and the foreground are separated by performing separation into a brightness component and a color difference component by color separation, normalizing the brightness component according to the color of the background area, and compressing the color difference component by a threshold. Therefore, it can be predicted that the image ends up being cloudy as a whole.

In Japanese Patent Application Laid-Open No. 2008-060839, a separation into a brightness component and a color difference component is made by color separation, and the thresholds are followed up and changed for the components. Although the differences between the input values and the thresholds are compared for the brightness component and the color difference component, the brightness of the background area and the foreground affects the threshold estimation in the same way. In other words, the counter variation is not changed according to the difference value in Japanese Patent Application Laid-Open No. 2008-060839. Therefore, the foreground significantly affects the entire document in a read document with less background area and more foreground area, and the density may be removed up to the foreground area of the document. In the use of a copying machine that deals with a variety of types of read documents, it is a problem that the density of the foreground area of document is accidentally removed depending on the type of read document.

SUMMARY OF THE INVENTION

An object of the present invention is to execute a stable background color removal process regardless of the type of a read document by determining a count variation, which affects the estimation of a background level, for each pixel based on the brightness of a target pixel of image data.

The present invention provides an image processing apparatus comprising: a conversion unit that converts input image data into a brightness component; a calculating unit that calculates a difference between the brightness component converted by the conversion unit and a predetermined threshold; a determining unit that determines a count variation for each pixel of the image data according to the difference; a threshold changing unit that changes the threshold based on a result of accumulating the count variations in the image data; and a processing unit that executes a process of setting the new threshold generated by the threshold changing unit as a background level to remove the background of the image data.

According to the present invention, a stable background color removal process can be executed regardless of the type of a read document by determining a count variation, which affects the estimation of a background level, for each pixel based on the brightness of a target pixel of image data. Whether the target pixel looks close to the background can be determined and the influence on the threshold estimation can be gradually switched according to the closeness to the background by determining the counter variation for following up and changing the threshold based on a difference between a brightness component of the image data and a predetermined threshold (background level).

An object of the present invention is to provide a new function. To attain the object, the claims and other features of the present invention will become apparent from the following specification and drawings.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a detailed block diagram of a schematic configuration of a conventional image forming apparatus.

FIG. 4 is a detailed block diagram of a schematic configuration of the image forming apparatus according to the present embodiment.

DESCRIPTION OF THE EMBODIMENTS

Exemplary embodiments of the present invention will now be described with reference to the drawings.

Figure 1:
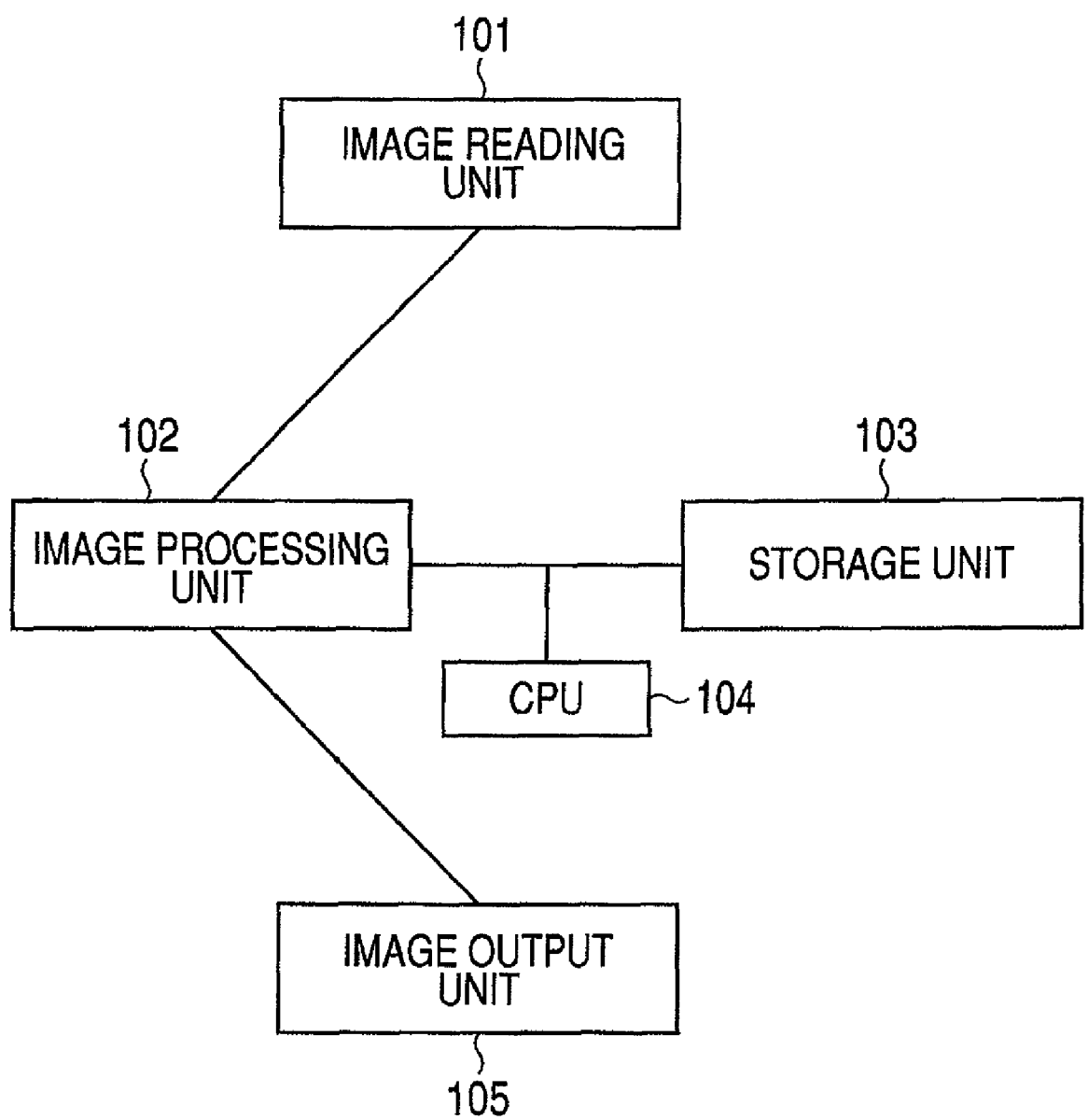
FIG. 1 is a block diagram of a schematic configuration of an image forming apparatus according to the present embodiment.

FIG. 1 is a block diagram of a schematic configuration of an image forming apparatus according to the present embodiment.

As shown in FIG. 1, the image forming apparatus according to the present embodiment includes an image reading unit 101, an image processing unit 102, a storage unit 103, a CPU 104, and an image output unit 105. In the present embodiment, an apparatus including the image processing unit 102, the storage unit 103, and the CPU 104 will be called an image processing apparatus.

The image reading unit 101 reads an image of a document and outputs image data. An example of the image reading unit 101 is a scanner.

The image processing unit 102 applies image processing to print information including image data externally input from the image reading unit 101 or a PC. More specifically, the image processing unit 102 is divided into a scan image processing unit 301 and a print image processing unit 302 as illustrated in FIG. 4. The scan image processing unit 301 applies image processing, such as a shading correction process, a filtering process, and an input color correction process not shown, to the read document image. The print image processing unit 302 executes image processing such as a background color removal process as well as an output color correction process and a halftone process not shown.

In the shading correction process, normalization is performed with a white reference attached to the image reading unit 101 as an absolute white level. However, if the brightness of the background of the read document is lower than the white reference, the brightness of the background remains, and the background of the read document is left. The left background is reproduced in printing, which leads to degraded output image quality. The background color removal processing unit 303 realizes further improved image quality by skipping a signal value of the background that cannot be removed in the shading correction process. The details of the background color removal processing unit 303 will be described later.

The image data processed by the image processing unit 102 is stored in the storage unit 103. The storage unit 103 includes a ROM, a RAM, a hard disk (HD) and the like. The ROM stores various control programs executed by the CPU 104 and an image processing program illustrated in FIG. 5. The RAM and the HD are used as reference areas and operation areas for the CPU 104 to store data and various types of information.

The image output unit 105 forms and outputs a color image on a recording medium such as recording paper. An example of the image output unit 105 is an electrophotographic printer as described below.

Figure 2:
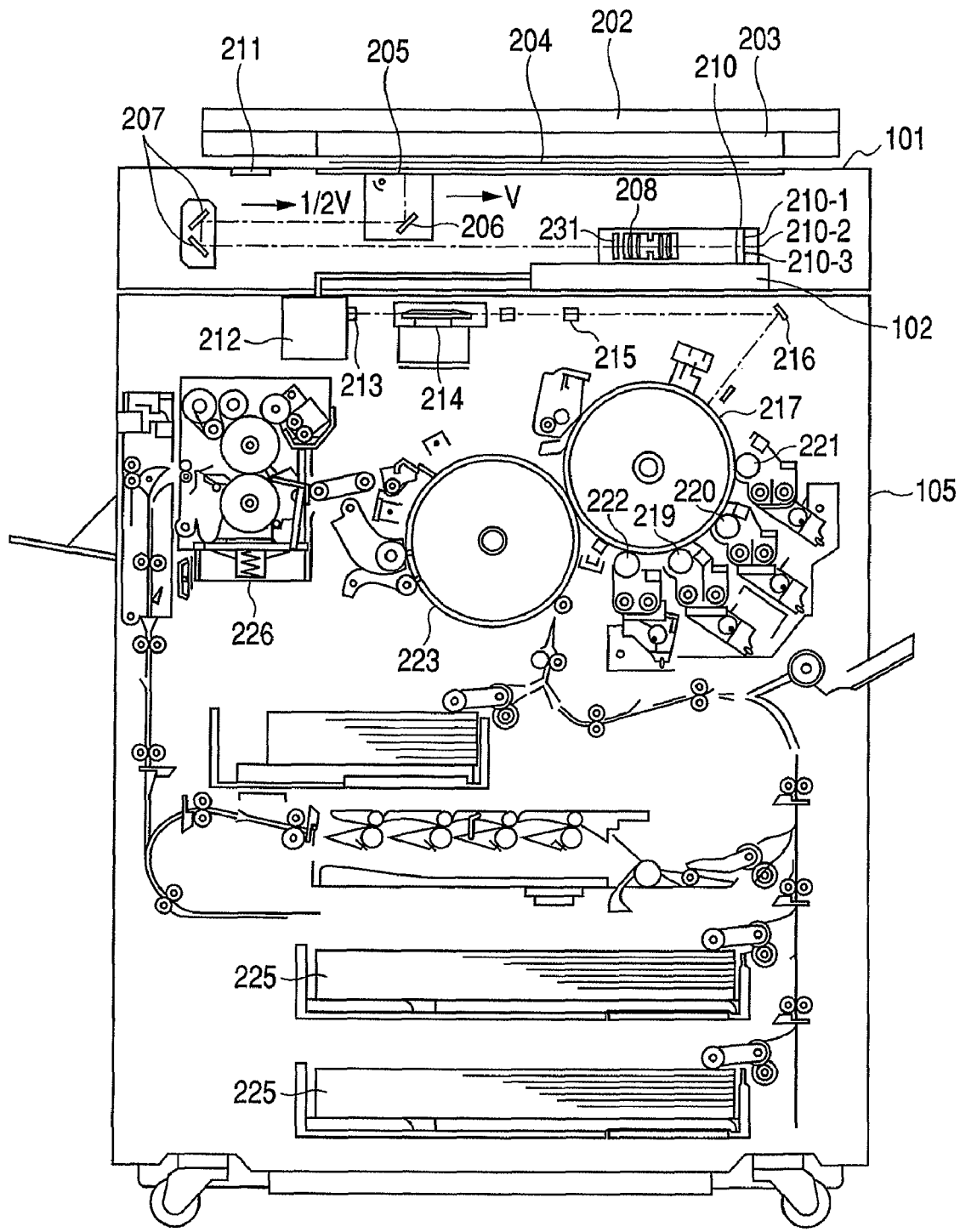
FIG. 2 is an overview diagram of the image forming apparatus according to the present embodiment.

FIG. 2 is an overview diagram of the image forming apparatus according to the present embodiment.

In FIG. 2, a document 204 for image reading is placed between a platen glass 203 and a document plate 202 in the image reading unit 101. When the light of a lamp 205 is illuminated on the document 204, the reflected light from the document 204 is directed to mirrors 206 and 207, and lenses 208 form an image on a 3-line sensor 210. An infrared cut filter 231 is arranged on the lenses 208. A motor not shown moves a mirror unit including the mirror 206 and the lamp 205 at a velocity V and a mirror unit including the mirrors 207 at a velocity V/2 in the direction of arrows. Thus, the mirror units move in a perpendicular direction (sub scanning direction) relative to the electronic scanning direction (main scanning direction) of the 3-line sensor 210 to scan the entire surface of the document 204.

The 3-line sensor 210 consisted of 3-line CCDs includes a CCD 210-1 that receives red light R, a CCD 210-2 that receives green light G, and a CCD 210-3 that receives blue light B. With such a configuration, the colors of input light information are separated in order to read color components of full color information red R, green G, and blue B. Each of the CCDs 210-1 to 210-3 constituting the 3-line sensor 210 includes light receiving elements of 8000 pixels. The CCDs 210-1 to 210-3 can read in the lateral direction of an A3 sized document (297 mm), which is the maximum size of document that can be placed on the platen glass 203, with the resolution of 600 DPI.

A standard white plate 211 corrects data read by the CCDs 210-1 to 210-3 of the 3-line sensor 210. The standard white plate 211 is a white plate having substantially uniform reflection characteristics in visible light.

The image processing unit 102 electrically processes an image signal input from the 3-line sensor 210 to generate color component signals of magenta M, cyan C, yellow Y, and black K and transmits the generated MCYK color component signals to the image output unit 105.

The image output unit 105 transmits the M, C, Y, and/or K image signals transmitted from the image reading unit 101 to a laser driver 212. The laser driver 212 modulates and drives a semiconductor laser element 213 according to the input image signals. The laser beam output from the semiconductor laser element 213 scans a photosensitive drum 217 through a polygon mirror 214, an fθ lens 215, and a mirror 216 to form an electrostatic latent image on the photosensitive drum 217.

A developing device includes a magenta developing device 219, a cyan developing device 220, a yellow developing device 221, and a black developing device 222. Four developing device alternately touch the photosensitive drum 217 to develop the electrostatic latent image formed on the photosensitive drum 217 with corresponding color toners to form a toner image. Recording paper supplied from a recording paper cassette 225 is wound around a transfer drum 223, and the toner image on the photosensitive drum 217 is transferred to the recording paper.

The recording paper sequentially transferred with toner images of four colors M, C, Y, and K passes through a fixing unit 226. As a result, the toner images are fixed, and the recording paper is discharged outside the apparatus.

Details of a background color removal process according to the present embodiment will now be described. The input to the present process is image data input from one of the image reading unit 101 and from outside, and the background color removal processing unit 303 in the print image processing unit 302 of the image processing unit 102 executes the process.

Figure 5:
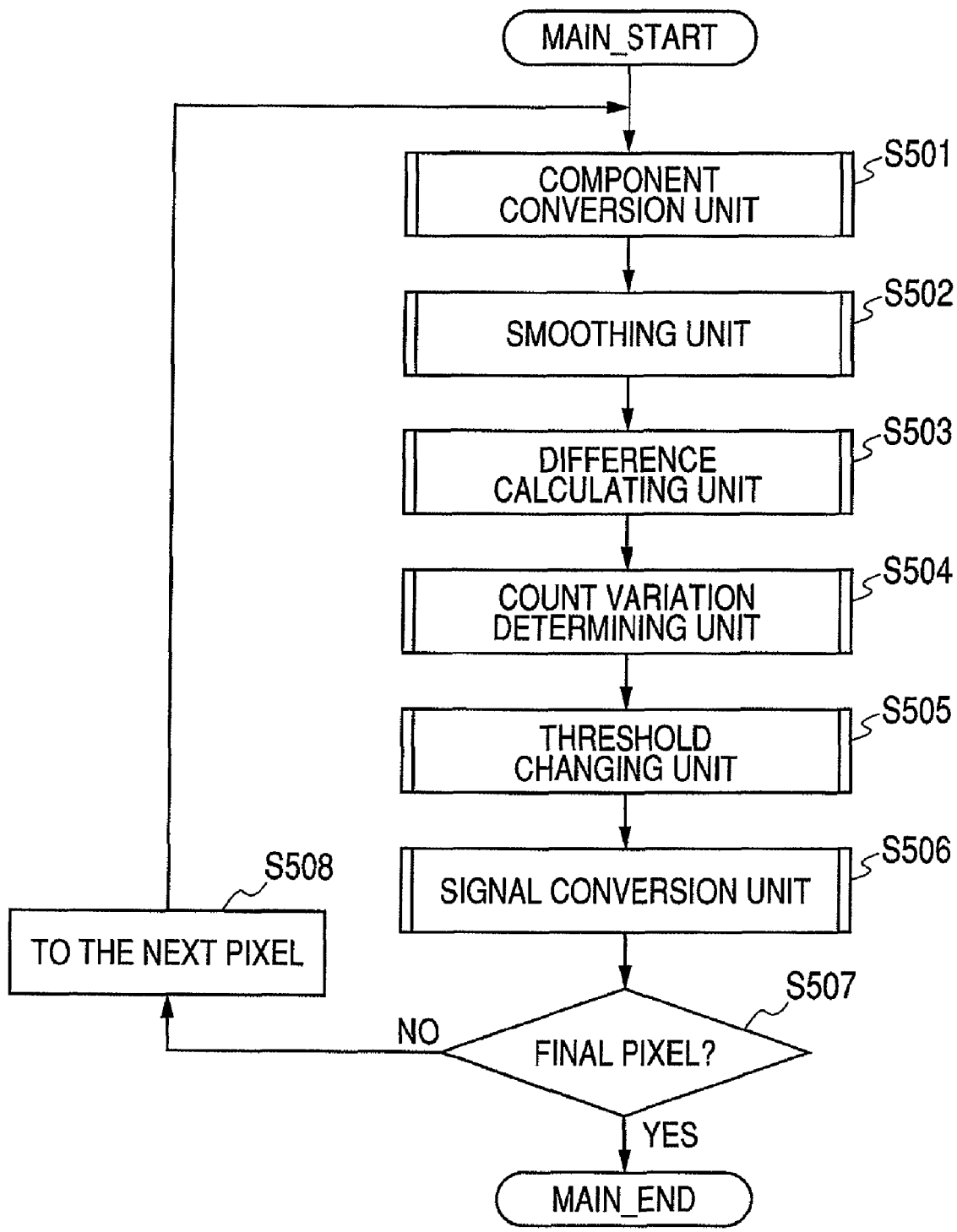
FIG. 5 is a flow diagram of a background color removal process of the present embodiment.

FIG. 5 illustrates a flow diagram of the background color removal process according to the present embodiment. The CPU 104 reads and executes a program that is stored in the ROM 103 and that is for executing the flow chart of FIG. 5 to execute the process illustrated in FIG. 5.

The present process envisages sequential processes in which the document data read by the image reading unit 101 is input pixel by pixel in the reading order, and the pixels are output one by one accordingly. Details of the processes will be described with reference to the flow chart of FIG. 5.

In S501, when RGB information of a target pixel is input, the background color removal processing unit 303 converts the RGB information into a brightness component. The brightness component is, for example, a brightness component L and is calculated by the following expression.

$$L = \frac{(R + 2 \times G + B)}{4}$$

However, the calculation is only an example. The calculation is not limited to this, and other calculations may be used.

The brightness component may be L of CIE Lab space, Y of YUV space, L of Luv space, or Y of YCbCr space.

In S502, the background color removal processing unit 303 smoothes the brightness component converted in S501 based on values of a plurality of surrounding pixels including the target pixel. The brightness component of the target pixel and the brightness component of the surrounding pixels of the target pixel are used to execute a filtering process, such as calculation of an average, that attains the smoothing effect.

The size and shape of the filter used for smoothing can be determined according to the required system configuration. For example, an N×N filter around the target pixel can be used if delay buffers of a plurality of lines can be used, and an N×1 filter with the target pixel at the top can be used if the line buffers cannot be used. However, the method is only an example, and the size and shape of the filter are not limited to these.

Smoothing the brightness component improves the accuracy of a count variation determining unit (S504) described below as compared to when the component value of the target pixel is used without change. As a result, more stable background level estimation is realized.

Specifically, smoothing the brightness component of the target pixel can prevent input values of one of image data expressed by area gradation with halftone dots and of image data with noise from changing due to noise components.

In S503, the background color removal processing unit 303 calculates the difference between a predetermined component smoothed in S502 and a threshold. The threshold herein is a threshold corresponding to a predetermined component determined pixel by pixel and is a value determined based on the result of the previous pixel processing. A threshold determined in a certain pixel serves as a background level of the pixel. The threshold, or the background level, changes pixel by pixel. A proper value (initial value) is set before starting the process of the first pixel.

Assuming that the difference is Dif, the input value is L_in, and the threshold is level_L, Dif=L_in-level_L is formed. Assuming that the maximum value of input is MAX, the possible range of the difference Dif is between −MAX and MAX. The use of the difference between the input value and the threshold allows the execution of a stable process because the calculation is performed based on a relatively consistent standard of a distance from the threshold even if one of the types and the characteristics of the read documents are different, or if the threshold changes as the process proceeds. As a whole, the threshold of a bright read document is large, while the threshold of a dark read document is small. If the absolute amount of the input value is used as a standard for the determination, the distinction between the foreground of a bright read document and the background area of a dark read document is difficult. As a result, the characteristics of the read document cannot be taken into consideration, and the process may fail and the intended effect may not be attained depending on the read document. Meanwhile, a changing threshold of the read document is a background level estimated before the pixel of the previous target pixel, and the threshold indicates the characteristics of the read document of the target pixel. The use of the difference between the input value and the threshold is equivalent to the elimination of the characteristics of the read document. Therefore, the foreground of a bright read document and the background area of a dark read document have different values and can be distinguished. Thus, a stable process based on a relatively consistent standard can be executed.

Figures 6, 7:
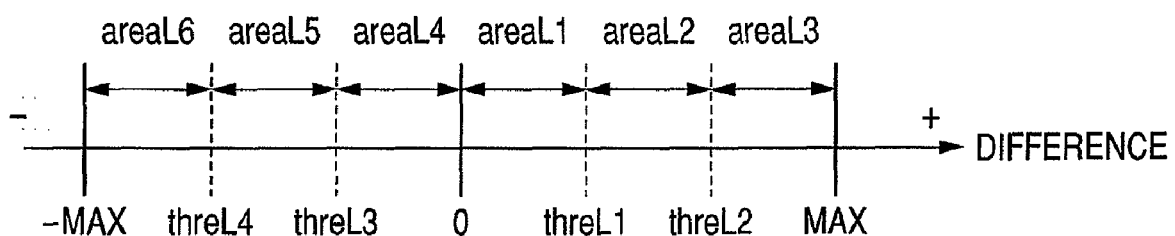
FIG. 6 is an area division example used for determining a count variation.
FIG. 7 is an example of table used for determining the count variation.

Based on the difference calculated in S503, the background color removal processing unit 303 determines the count variation (S504) for use in a threshold changing unit described below (S505). FIGS. 6 and 7 are diagrams for describing a method for determining the count variation in the present embodiment. The possible range of the difference is divided into arbitrary areas, and to which area the difference Dif in the target pixel belongs is determined. FIG. 6 illustrates an example, in which the range is divided into six areas:

when $0<\text{Dif} \leq \text{threL1}$, area L1;
when $\text{threL1}<\text{Dif} \leq \text{threL2}$, area L2;
when $\text{threL2}<\text{Dif} \leq \text{MAX}$, area L3;
when $\text{threL3} \leq \text{Dif}<0$, area L4;
when $\text{threL4} \leq \text{Dif}<\text{threL3}$, area L5; and
when $-\text{MAX} \leq \text{Dif}<\text{threL4}$, area L6.

FIG. 7 is an example of a table indicating the count variations provided for the areas divided in FIG. 6. In the example of FIG. 7, it is assumed that the possibility of the target pixel forming the background is higher when the difference is smaller, and the count variation is set to become larger.

It is also assumed that the possibility of the target pixel not forming the background is higher when the difference is greater, and the count variation is set to become smaller. For example, when the difference is small in a target pixel and is within the areaL1 illustrated in FIG. 6, the count variation is 4, with reference to the table of FIG. 7. When the difference is large in a target pixel and is within the areaL3 illustrated in FIG. 6, the count variation is 1, with reference to the table of FIG. 7. In the example, the pixel belonging to the areaL1 looks four times closer to the background than the pixel of the areaL3, and the closeness to the background is taken into consideration in the process.

If a pixel (such as the background) with a small difference becomes a pixel to be processed after pixels (such as black pixels) with large difference continued, a great amount of count variations is accumulated, and the threshold immediately changes. As a result, the influence of the pixels (such as black pixels) with large differences on the threshold change can be reduced, and a background color removal process of the background area can be executed.

If the count variation is determined depending on whether the input value is greater or smaller than the threshold, not according to the difference between the input value and the threshold, as in the conventional technique of Japanese Patent Application Laid-Open No. 2008-060839, the threshold is significantly small in an area where black pixels continue. The brightness values of gray pixels (for example, around brightness 180) next to the consecutive black pixel areas become larger than the threshold, and the pixels are accidentally determined as background areas. It is a problem that the background color removal process is executed for the gray pixels.

To deal with the problem, the count variation is determined according to the difference between the input value and the threshold in the present invention. Therefore, the increase and decrease of the count variation is small because the difference is large even if areas with small input values, or black pixel areas, continue. As a result, the threshold does not change much in the consecutive black pixel areas, and the accidental skipping of the background of the gray pixel areas next to the black pixel areas can be prevented.

If pixels (black pixels) in which the brightness values of the input values are significantly smaller than the threshold continue and pixels close to the background level continue after that, the threshold can be reset to the initial value at the border of the black pixels and the pixels of the background level.

The count variation is determined according to the difference between the input value and the threshold in the present embodiment. However, the count variation may be determined based on the input value without using the difference. For example, the count variation of the input value close to the background level (around brightness 200) may be set large, and the count variation of one of the pixel (black pixel) with low brightness and of the pixel (white pixel) with high brightness may be set small.

The number of divided areas of difference and the values of the count variation table are not limited to these. A background color removal process suitable for each apparatus can be realized by adjusting the set values according to the characteristics of the image reading unit 101 to be designed. When Dif=0, the count variation is not set because the input value and the threshold are balanced. The details will be described below.

Figure 8:
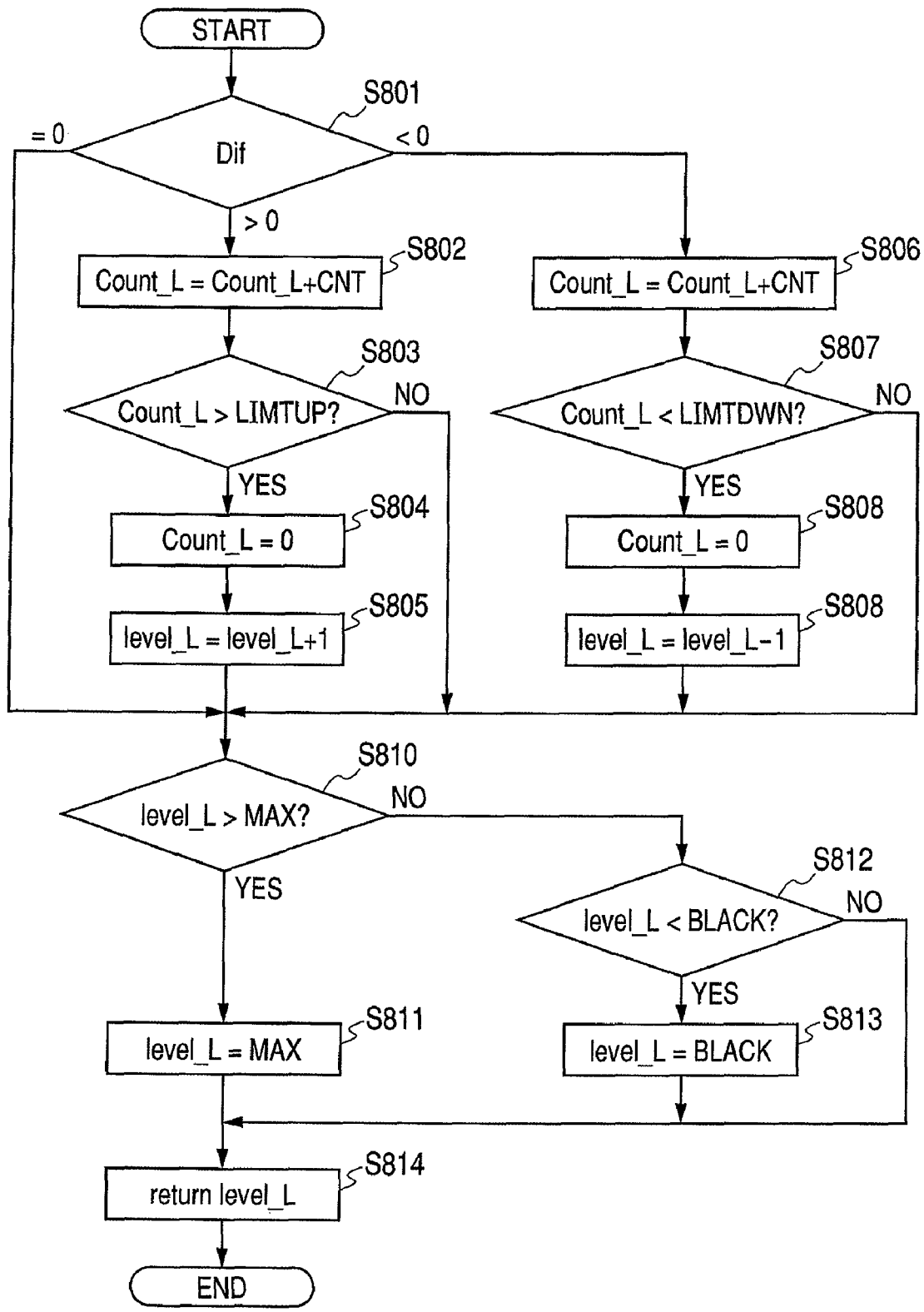
FIG. 8 is a flow diagram of a threshold changing process.

The background color removal processing unit 303 then uses the difference calculated in S503 and the count variation determined in S504 to execute a process of changing the threshold (S505). FIG. 8 illustrates a flow of a threshold changing process in the present embodiment. The count variation determined in S504 will be referred to as CNT, a counter variable will be referred to as Count_L, the upper limit of the counter variable will be referred to as LIMITUP, the lower limit will be referred to as LIMITDWN, and the follow-up limit of the threshold will be referred to as BLACK. BLACK is a lower limit value of the background level. The designer designates LIMITUP, LIMITDWN, and BLACK in advance. In the present embodiment, the initial value of level_L will be referred to as MAX, and the initial value of Count_L is 0.

Whether the difference Dif is positive or negative is determined (S801). Consequently, if the difference Dif is greater than 0 (>0 in S801), the counter variable Count_L is updated by adding the count variation CNT (S802). The count variable Count_L is updated as the count variations of the pixels are accumulated. The updated Count_L and the upper limit LIMITUP of the counter variable are then compared (S803). Consequently, if Count_L is greater than LIMITUP (predetermined count value) (YES in S803), Count_L is cleared to zero (S804), and the threshold level_L is incremented (S805). On the other hand, if Count_L is smaller than LIMITUP (NO in S803), the process proceeds without performing steps S804 and S805.

Meanwhile, if the difference Dif is smaller than 0 (<0 in S801), the counter variable Count_L is updated by adding the count variation CNT (S806). The updated Count_L and the lower limit LIMITDWN of the counter variable are then compared (S807). As a result, if Count_L is smaller than LIMITDWN (YES in S807), Count_L is cleared to zero (S808), and the threshold level_L is decremented (S809). On the other hand, if Count_L is greater than LIMITDWN (NO in S807), the process proceeds without performing steps S808 and S809.

Meanwhile, if the difference Dif is 0 (0 in S801), it can be stated that the input value and the threshold are balanced. Therefore, there is no need to influence the count change, and the process proceeds without changing the counter variable and the threshold. The reason that the counter variation is not set when Dif=0 as illustrated in FIG. 6 is that the counter is not changed in this case.

The threshold level_L and MAX are compared in the next step (S810). If the threshold level_L is greater than MAX (YES in S810), the threshold is clipped to the value of MAX (S811). If the threshold level_L is smaller than MAX (NO in S810) and smaller than BLACK (YES in S812), the threshold level_L is clipped to the value of BLACK (S813). This can prevent the threshold from overflowing and the result from failing. Skipping of image can also be prevented by avoiding the threshold from being smaller than the follow-up limit BLACK.

The threshold level_L calculated through the foregoing steps is determined as the background level in the target pixel (S814).

The threshold level_L may be returned to the initial value MAX after pixels (such as black pixels) with large difference have continued for more than predetermined pixels (for example, 100 pixels).

Based on the threshold determined in S505, the background color removal processing unit 303 converts input RGB information signals into output RGB information signals applied with the background color removal process (S506). A multiplicity of expressions for using the threshold to obtain the background color removal effect are known, and any expression may be used in the present invention. The following expression is used as an example in the present embodiment. The input RGB information signals will be referred to as R_in, G_in, and B_in, and the output RGB information signals will be referred to as R_out, G_out, and B_out.

$$R\_out = R\_in \times \frac{MAX}{level\_L}$$

$$G\_out = G\_in \times \frac{MAX}{level\_L}$$

$$B\_out = B\_in \times \frac{MAX}{level\_L}$$

Figure 9:
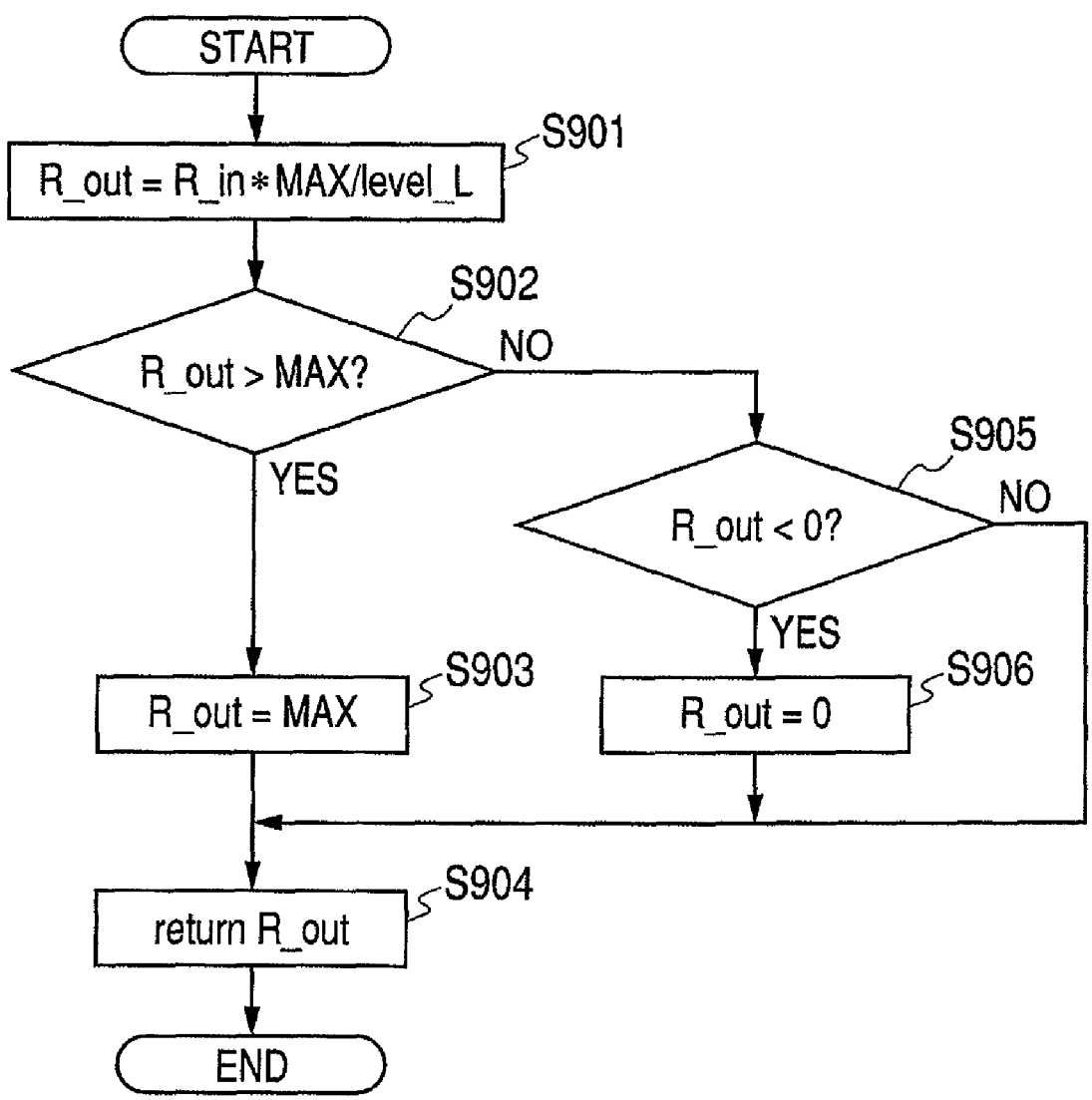
FIG. 9 is a flow diagram of a signal conversion process.

FIG. 9 is a flow diagram of a signal conversion according to the present embodiment. Although the process is executed for each of the RGB signals, FIG. 9 is a flow diagram for the R signal. The same processes are executed for the G signal and the B signal, although not shown. Processing of the R signal will be described as a representative example herein. The background color removal expression is used to calculate the output signal R_out based on the input signal R_in and the threshold level_L determined in S505 (S901).

The output signal R_out and MAX are compared in the next step (S902). If the output signal R_out is greater than MAX (YES in S902), the output signal is clipped to the value of MAX (S903). If the output signal R_out is smaller than MAX (NO in S902) and smaller than 0 (YES in S906), the output signal R_out is clipped to 0 (S906).

The output signal R_out converted through the steps is determined as an output R signal in the target pixel (S904).

Figure 10:
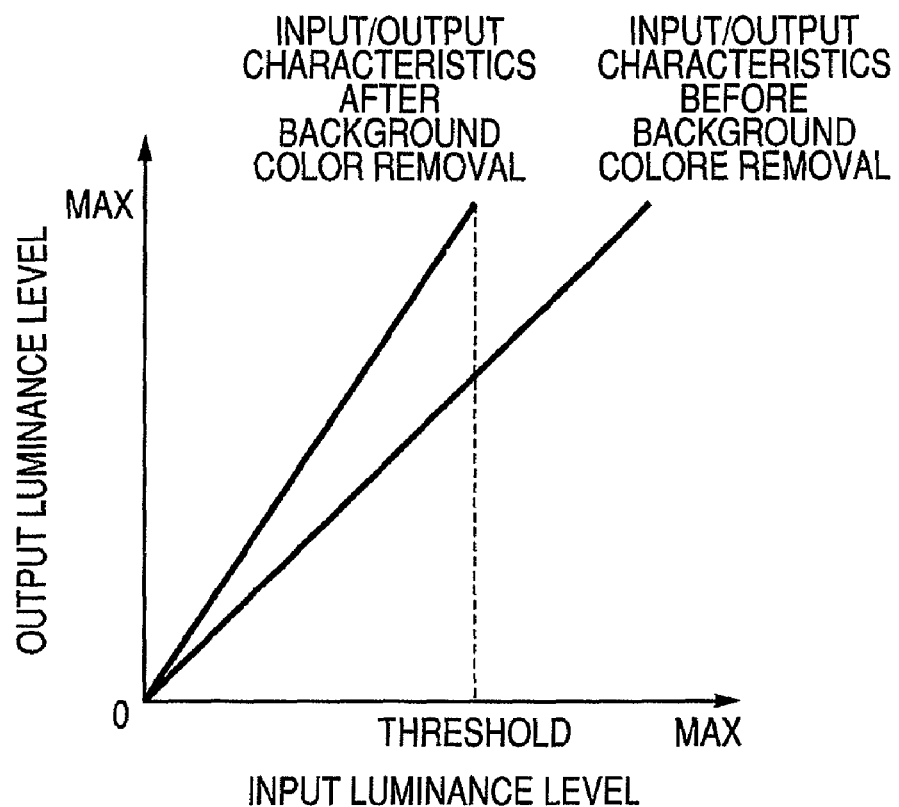
FIG. 10 illustrates a background color removal effect obtained by the signal conversion process.

FIG. 10 illustrates an effect of the background color removal process obtained by the signal conversion (S506). The slope of the output brightness after the background color removal process relative to the input brightness level changes so that the output brightness level is MAX at the threshold (background level).

Lastly, whether the target pixel finished with the process is a final pixel is determined in S507, and if the target pixel is not the final pixel (NO in S507), the target pixel is changed to the next pixel (S508), and the process returns to the start. If the target pixel finished with the process is the final pixel (YES in S507), the entire process ends.

The process may return to the difference calculating unit of S503 if S507 is NO. In this case, the component conversion and smoothing are performed for all pixels of the image data in S501 and S502.

According to the present embodiment, the counter variation is determined based on the difference between the smoothed input component and the threshold to determine whether the target pixel looks close to the background to gradually switch the influence on the threshold estimation. In this way, a stable background color removal process is realized regardless of the type of read document.

(Second Embodiment)

Although the background color removal processing unit 303 uses the difference between the smoothed brightness component and the threshold to determine the counter variation in the first embodiment (S504), the threshold can be more accurately estimated by using a chroma component in addition to the use of the difference in the determination.

Details of the processes will be described with reference to the flow chart of FIG. 5.

In S501, the background color removal processing unit 303 calculates the brightness L as in the first embodiment and further calculates a chroma component S. The chroma component S is calculated by, for example, the following expression.

$$S = MAX(R,G,B) - MIN(R,G,B)$$

However, the calculation is only an example and is not limited to this. Other calculations may be used as long as the color component is expressed.

In the smoothing unit of S502, the background color removal processing unit 303 smoothes the brightness components based on the values of a plurality of surrounding pixels including the target pixel as in the first embodiment. The chroma component may also be smoothed by an equivalent unit.

In the difference calculating unit of S503, the background color removal processing unit 303 calculates the difference between the brightness component and the threshold as in the first embodiment.

Figure 11:
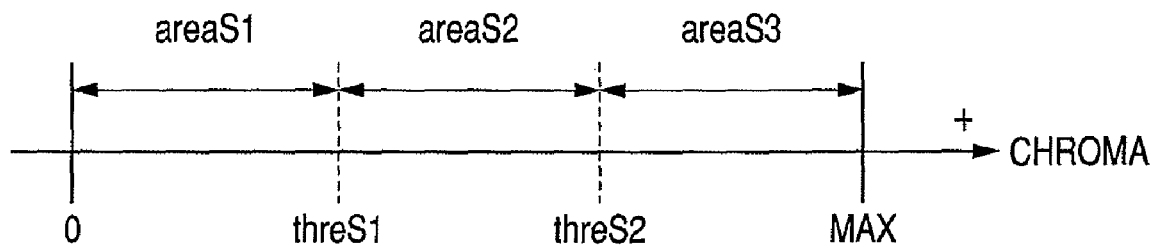
FIG. 11 is another area division example used for determining the count variation.
Figures 12, 13:
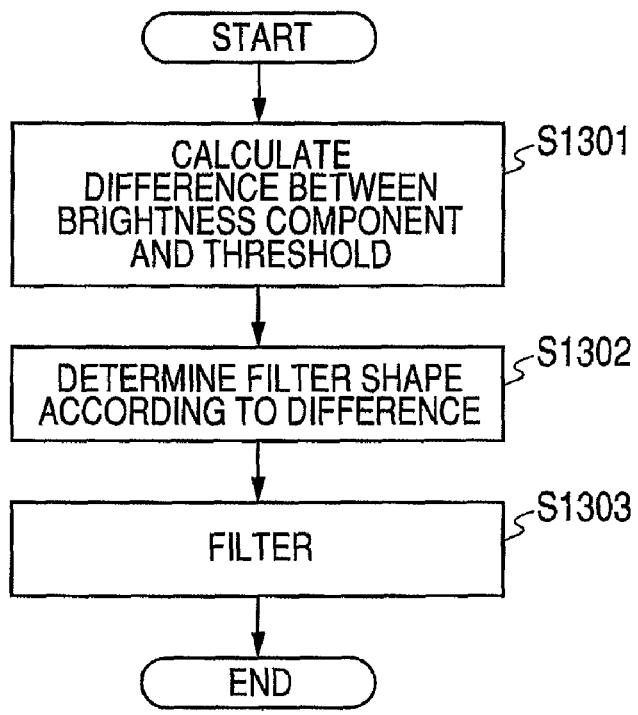
FIG. 12 is another example of table used for determining the count variation.
FIG. 13 is a flow diagram of a smoothing process according to a third embodiment.

In the count variation determining unit of S504, the background color removal processing unit 303 uses the brightness component difference and the chroma component. FIGS. 6, 11, and 12 are diagrams for describing a count variation determination method in the present embodiment. The area determination of the difference Dif in the target pixel is as illustrated in FIG. 6 and is equivalent to that in the first embodiment. The possible range of the chroma S is divided into arbitrary areas as in the determination method of the difference Dif, and to which area the chroma S in the target pixel belongs is determined. FIG. 11 illustrates an example. The possible range of the chroma S is between 0 and MAX, as follow:

when $0 \leq S \leq threS1$, area S1;
when $threS1 < S \leq threS2$, area S2; and
when $threS2 < S \leq MAX$, area S3.

FIG. 12 is an example of a table illustrating the count variations provided to the areas in which the difference and the chroma are divided. In the example of FIG. 12, it is assumed that the possibility of the target pixel forming the background is higher when the difference is smaller and the chroma is smaller, and the count variation is set to become larger. It is also assumed that the possibility of the target pixel forming the background is lower when the difference is greater and the chroma is greater, and the count variation is set to become smaller. For example, when the difference is small in a target pixel and is within the areaL1 illustrated in FIG. 6 and the chroma is small and is within the areaS1 illustrated in FIG. 11, the count variation is 10, with reference to the table of FIG. 12. When the difference is moderate in a target pixel and is within the areaL2 illustrated in FIG. 6 and the chroma is moderate and is within the areaS2 illustrated in FIG. 11, the count variation is 3, with reference to the table of FIG. 12. When the difference is large in a target area and is within the areaL3 illustrated in FIG. 6 and the chroma is large and is within the areaS3 illustrated in FIG. 11, the count variation is 0, with reference to the table of FIG. 12. In the example, the pixel belonging to the areaL1 and areaS1 looks closest to the background and looks three times closer to the background compared to the background of areaL2 and areaS2. The pixel belonging to the areaL3 and areaS3 is assumed to be an area not in the background and is not counted to avoid affecting the threshold change. The number of divided areas of difference and the values of the count variation table are not limited to these. The set values can be adjusted according to the characteristics of the image reading unit 101 to be designed to realize the background color removal process suitable for each image processing apparatus.

The processes after S505 are equivalent to those in the first embodiment, and the description will not be repeated.

According to the present embodiment, both of the difference and the chroma component are used to determine the count variation so that the threshold can be estimated more accurately. As a result, a stable background color removal process with few failed images is possible.

(Third Embodiment)

In the first and second embodiments, the background color removal processing unit 303 uses the smoothing unit of S502 to perform smoothing based on the values of a plurality of surrounding pixels including the target pixel. The count variation can be more accurately determined by devising the smoothing unit.

Processes in the present embodiment will be described in detail with reference to FIGS. 13 to 15.

FIG. 13 is a flow chart of a smoothing unit in the present embodiment. The input to the present flow chart is the brightness component of the target pixel converted in S501. The background color removal processing unit 303 first calculates the difference between an input value and a threshold in S1301. The threshold herein is equivalent to the threshold described in the first embodiment and is a background level determined as a result of the previous pixel processing.

Assuming that the difference is Dif, the input value is $L\_$, and the threshold is level_L, $Dif = L\_ - level\_L$ is formed. Assuming that the maximum value of input is MAX, the possible range of the difference Dif is between $-MAX$ and MAX.

Based on the difference calculated in S1301, the background color removal processing unit 303 determines the size and shape of the filter for smoothing (S1302). FIGS. 14 and 15 are diagrams for describing a method for determining the filter in the present embodiment. The possible range of the difference is first divided into arbitrary areas, and to which area the difference Dif in the target pixel belongs is determined. FIG. 14 illustrates an example, in which the range is divided into five areas:

when $threL7 \leq Dif \leq threL5$, area L7;
when $threL5 < Dif \leq threL6$, area L8;
when $threL6 < Dif \leq MAX$, area L9;
when $threL8 \leq Dif < threL7$, area L10; and
when $-MAX \leq Dif < threL8$, area L11.

Figures 14, 15:
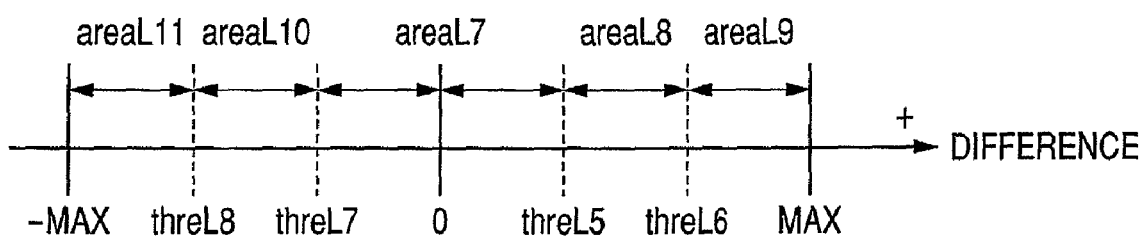
FIG. 14 is an area division example used for determining a smoothing filter.
FIG. 15 is an example of table used for determining the smoothing filter.

FIG. 15 is an example of a table illustrating filter sizes applied to the areas divided in FIG. 14. In the example of FIG. 15, it is assumed that the possibility of the target pixel forming the background is high when the difference is small, and a 7×7 filter of the maximum area is applied. It is also assumed that the possibility of the target pixel forming the background is lower when the difference is greater, and the applied filter size is set to be gradually smaller (3×3 filter, 1×1 filter). Obviously, not only the filter size, but also the filter shape can be set. The number of divided areas of difference as well as the values of the filter size and the filter shape are not limited to these.

An object of smoothing not only the values of the target pixel, but also the surrounding pixel values is to obtain a stable input value to avoid being influenced by the characteristics of the read document or by noise. Therefore, in general, the stability should improve if the filter size is larger. However, if a large filter size is applied in all pixels, the accuracy may be rather poor when the smoothing is performed in areas with many frequency components, such as characters and photographs. Therefore, the closeness of the target pixel to the background is determined according to the difference calculated in S1301, and a large filter size is used for pixels with many low frequency components and high possibility of background, and a small filter size is used for pixels with many high frequency components and low possibility of background. In this way, the accurate smoothing can be realized according to the closeness of the target pixel to the background.

The background color removal processing unit 303 then performs smoothing based on the size and shape of the filter determined in S1302 (S1303). An example of the method of smoothing includes a method of obtaining the average of brightness components calculated from all pixel values within the selected filter size. A coefficient of the filter may also be set so that the strength of smoothing can be changed. The method of smoothing is not limited to this, and other methods may be used as long as the smoothing effect can be obtained.

The processes after S503 are equivalent to those in the first and second embodiments, and the description will not be repeated.

According to the present embodiment, the size and shape of the filter applied in the smoothing unit is switched based on the difference to realize the accurate smoothing according to the closeness to the background. As a result, more stable estimation of the background level is possible.

(Fourth Embodiment)

Although the smoothing unit of S502 in the background color removal processing unit 303 uses the difference between the brightness component and the threshold to determine the filter size for smoothing in the third embodiment, attribute information can also be used. The attribute information herein is information formed into a flag by an attribute determination process that is one of the processes not shown executed in the scan image processing unit 301 and that is for determining whether the pixels of the read document data are character areas or halftone dot areas. The use of the attribute information allows the applications of individual image processes, such as a color conversion process and a sharpness adjustment process not shown, according to the areas to thereby improve the image quality.

The processes of the present embodiment will be described in detail with reference to FIGS. 16 and 17.

Figures 16, 17:
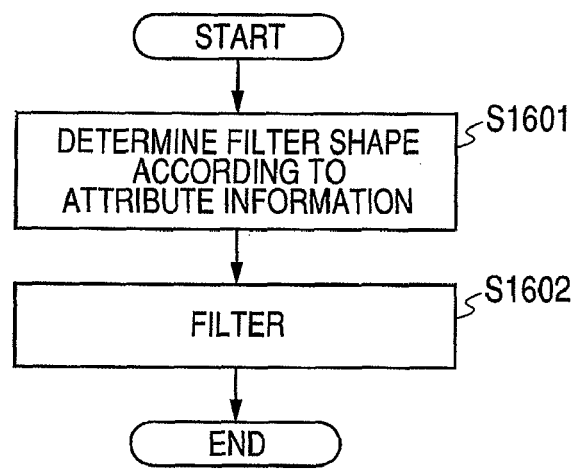
FIG. 16 is a flow diagram of a smoothing process according to a fourth embodiment.
FIG. 17 is another example of table used for determining the smoothing filter.

FIG. 16 is a flow chart of a smoothing unit in the present embodiment. The input to the present flow chart is equivalent to that in the third embodiment.

The background color removal processing unit 303 first acquires the attribute information in S1601 to determine the size and shape of the filter for smoothing based on the acquired attribute information. FIG. 17 is an example of a table illustrating the filter size applied to the attribute information. In the example of FIG. 17, a 1×1 filter is applied for character areas, a 3×3 filter is applied for photographic areas, and a 7×7 filter is applied for background areas and halftone dot areas. The reason that the filter size is switched according to the attribute information is the same as in the third embodiment. A small filter size is used in areas with many high frequency components, such as characters and photographs, and a large filter size is used for areas with many low frequency components such as the background. Since the gradation of the halftone dot areas is expressed by the area gradation, setting a large filter size allows the result of the smoothing to be close to the brightness component of document that is actually intended to be expressed. There is also an advantage of preventing the fluctuation of the input values in a short period of the halftone dots, and the subsequent processes become stable. Obviously, not only the filter size, but also the filter shape may be set. The classification of the attribute information as well as the values of the size and shape of the filter to be applied are not limited to these.

The background color removal processing unit 303 then performs smoothing based on the filter size and shape of the filter determined in S1601 (S1602). The unit of smoothing is equivalent to that in the third embodiment.

The processes after S503 are equivalent to those in the first and second embodiments, and the description will not be repeated.

According to the present embodiment, the size and shape of the filter used in the smoothing unit is switched according to the attribute information to realize accurate smoothing according to the areas. As a result, more stable estimation of the background level is possible.

(Fifth Embodiment)

Although the smoothing unit of S502 in the background color removal processing unit 303 uses the attribute information to determine the filter size for smoothing in the fourth embodiment, the document type can also be used. The document type herein is, for example, a document type that is set by the user from the UI of the image processing apparatus or that is designated by the automatic determination in the image processing. Examples of the document type include characters, photographs, and printing paper photographs, and the document type is information designated job by job or page by page, not pixel by pixel.

The processes in the present embodiment will be described in detail with reference to FIGS. 18 and 19.

Figures 18, 19:
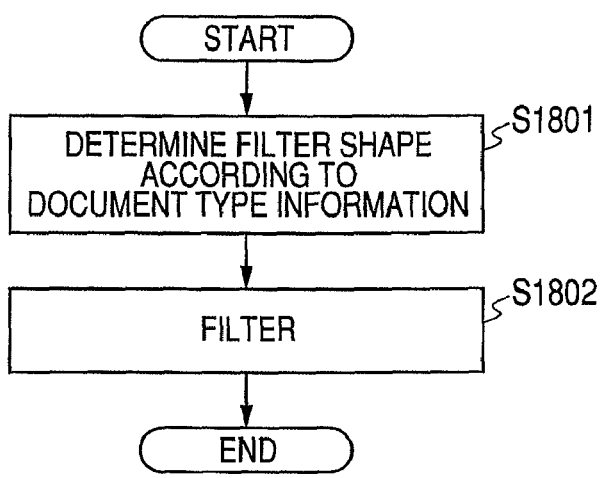
FIG. 18 is a flow diagram of a smoothing process according to a fifth embodiment.
FIG. 19 is another example of table used for determining the smoothing filter.

FIG. 18 is a flow chart of a smoothing unit in the present embodiment. The input to the present flow chart is equivalent to that in the third embodiment.

The background color removal processing unit 303 first acquires document type information in S1801 and determines the size and shape of the filter for smoothing based on the acquired document type information. FIG. 19 is an example of a table illustrating the filter size applied to the document type information. In the example of FIG. 19, a 1×1 filter is applied for the character type, and a 3×3 filter is applied for the printing paper photograph type and the photograph type. The information of document type is uniquely set for one of the pages and jobs and cannot be switched pixel by pixel. Therefore, one determined filter is used to execute the filtering process for smoothing all pixels of the input image data. A small filter size is set for the character type document which includes high frequency components, and a moderate filter size is set for the printing paper photograph type and the photograph type because it is predicted that not as many high frequency components as in the character type are included. Obviously, not only the filter size, but also the filter shape may be set. The classification of the document type information as well as the values of the size and shape of the filter to be applied are not limited to these.

The background color removal processing unit 303 then performs smoothing based on the size and shape of the filter determined in S1801 (S1802). The method of smoothing is equivalent to that in the third embodiment.

The processes after S503 are equivalent to those in the first and second embodiments, and the description will not be repeated.

According to the present embodiment, the smoothing unit switches the applied size and shape of the filter based on the document type information to realize accurate smoothing according to the document types with different characteristics. As a result, more stable estimation of the background level is possible. The reduced cost and the excellent image quality can both be realized by the accurate smoothing based only on the document type information in an inexpensive system without the attribute determination unit.

(Other Embodiments)

The object of the present invention can also be attained by the execution of the following process. More specifically, in the process, a storage medium recording a program code of software for realizing the functions of the embodiments is supplied to one of a system and an apparatus, and a computer (or CPU or MPU) of one of the system and the apparatus reads the program code stored in the storage medium. In this case, the program code itself read from the storage medium realizes the functions of the embodiments, and the program code and the storage medium stored in the program code constitute the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-166089, filed Jun. 25, 2008, which is hereby incorporated by reference herein in its entirety.

What is claimed is:

1. An image processing apparatus comprising:
a determining unit configured to determine a count variation for a pixel in image data according to a difference between a brightness component of the pixel in the image data and a predetermined threshold;
a threshold changing unit configured to change the threshold based on a result of accumulating the count variation for each pixel in the image data; and
a background level determining unit configured to determine the threshold changed by the threshold changing unit as a background level of the pixel in the image data,
wherein the determining unit makes the count variation smaller as the difference becomes larger.

2. The image processing apparatus according to claim 1, wherein the determining unit makes the count variation larger as the difference becomes smaller.

3. The image processing apparatus according to claim 1, wherein the threshold changing unit changes the threshold when the result of accumulating the count variations in the image data exceeds a predetermined count value.

4. The image processing apparatus according to claim 1, further comprising a smoothing unit configured to smooth the brightness component, wherein the determining unit determines the count variation for the pixel in the image data according to the difference between the brightness component smoothed by the smoothing unit and the predetermined threshold.

5. The image processing apparatus according to claim 4, wherein the smoothing unit executes a filtering process in an area including a target pixel of the image data and surrounding pixels of the target pixel.

6. The image processing apparatus according to claim 1, wherein the determining unit determines the count variation according to the difference and a chroma component of the pixel in the image data.

7. The image processing apparatus according to claim 6, wherein the determining unit makes the count variation smaller as the difference becomes larger and the chroma component becomes larger.

8. The image processing apparatus according to claim 5, wherein the smoothing unit determines a filter size used in the filtering process according to the difference between the brightness component and the predetermined threshold.

9. The image processing apparatus according to claim 5, wherein the smoothing unit determines a filter size used in the filtering process according to attribute information determined for each pixel of the input image data.

10. The image processing apparatus according to claim 5, wherein the smoothing unit determines a filter size used in the filtering process according to document type information of the input image data.

11. An image processing method comprising:
determining a count variation for a pixel in image data according to a difference between a brightness component of the pixel in the image data and a predetermined threshold;
changing the threshold based on a result of accumulating the count variation for each pixel in the image data; and
executing a background level determination process by determining the threshold changed in the changing as a background level of the pixel in the image data,
wherein the count variation is made smaller as the difference becomes larger.

12. The image processing method according to claim 11, wherein in the determining, the count variation is made larger as the difference becomes smaller.

13. The image processing method according to claim 11, wherein in the changing, the threshold is changed when the result of accumulating the count variations in the image data exceeds a predetermined count value.

14. The image processing method according to claim 11, further comprising smoothing the brightness component wherein the count variation is determined for the pixel in the image data according to the difference between the brightness component smoothed in the smoothing step and the predetermined threshold.

15. The image processing method according to claim 14, wherein the smoothing step executes a filtering process in an area including a target pixel of the image data and surrounding pixels of the target pixel.

16. The image processing method according to claim 11, wherein the determining step determines the count variation according to the difference and a chroma component of the pixel in the image data.

17. The image processing method according to claim 16, wherein in the determining, the count variation is made smaller as the difference becomes larger and the chroma component becomes larger.

18. The image processing method according to claim 15, wherein in the smoothing, a filter size used in the filtering process is determined according to the difference between the brightness component and the predetermined threshold.

19. The image processing method according to claim 15, wherein in the smoothing, a filter size used in the filtering process is determined according to attribute information determined for each pixel of the input image data.

20. The image processing method according to claim 15, wherein in the smoothing, a filter size used in the filtering process is determined according to document type information of the input image data.

21. A non-transitory computer-readable storage medium storing a program causing a computer to execute the image processing method according to claim 11.

22. The image processing apparatus according to claim 6, wherein the determining unit makes the count variation larger as the difference becomes smaller and the chroma component becomes smaller.

23. The image processing method according to claim 16, wherein in the determining, the count variation is made larger as the difference becomes smaller and the chroma component becomes smaller.

* * * * *